US006456393B1

(12) United States Patent
Bhattacharjya et al.

(10) Patent No.: US 6,456,393 B1
(45) Date of Patent: Sep. 24, 2002

(54) INFORMATION EMBEDDING IN DOCUMENT COPIES

(75) Inventors: Anoop K. Bhattacharjya; Hakan Ancin, both of Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/136,161

(22) Filed: Aug. 18, 1998

(51) Int. Cl.[7] .................................................. G06F 3/12
(52) U.S. Cl. ......................... 358/1.9; 358/448; 382/232
(58) Field of Search .............................. 358/1.12, 1.13, 358/1.9, 448, 452; 382/232, 181, 137, 306

(56) References Cited

U.S. PATENT DOCUMENTS

| | | | | |
|---|---|---|---|---|
| 5,315,098 A | | 5/1994 | Tow | 235/494 |
| 5,606,628 A | * | 2/1997 | Miyabe et al. | 382/183 |
| 5,699,427 A | | 12/1997 | Chow et al. | 380/3 |
| 5,710,636 A | | 1/1998 | Curry | 358/298 |
| 5,710,834 A | | 1/1998 | Rhoads | 382/232 |
| 5,734,752 A | | 3/1998 | Knox | 382/212 |
| 5,987,127 A | * | 11/1999 | Ikenoue et al. | 380/7 |
| 6,047,374 A | * | 4/2000 | Barton | 713/150 |
| 6,049,627 A | * | 4/2000 | Becker et al. | 382/181 |
| 6,055,321 A | * | 4/2000 | Numao et al. | 382/100 |
| 6,094,483 A | * | 7/2000 | Fridrich et al. | 380/28 |

* cited by examiner

Primary Examiner—Mark Wallerson

(57) ABSTRACT

A photocopier (10) scans a document and so modifies the resultant image as to embed in a resultant copy information that is visually imperceptible. To do so, it identifies regions (32, 33) that consist primarily of text-character parts. It embeds a message bitstream by selectively darkening the text pixels in such regions in accordance with the values of successive bits in the bitstream.

37 Claims, 10 Drawing Sheets

INFORMATION EMBEDDING IN DOCUMENT COPIES

BACKGROUND OF THE INVENTION

The present invention concerns embedding information in documents in a visually imperceptible way. It particularly concerns embedding such information in document photocopies. Since facilities for reproducing documents are widely available, it has become important in many situations to be able to track document reproduction. A way that has commonly been suggested is for the copier somehow embed information that is not readily perceptible visually but can nonetheless be recovered by machine optical scannings. One proposed approach is to add a number of low-amplitude perturbations to the original image and then correlate those perturbations with images of suspected copies. If the correlations are as expected, then the suspected document is very probably a copy. But this approach tends to introduce an element of judgment, since it is based on varying degrees of correlation. Also, it does not lend itself well to embedding actual messages, such as copier serial numbers.

Another approach is to employ half-toning patterns. If the dither matrices employed to generate a half-toned output differ in different segments of an image, information can be gleaned from the dither-matrix selections in successive regions. But this approach is limited to documents generated by half-toning, and it works best for those produced through the use of so-called clustered-dot dither matrices, which are not always preferred.

Both of these approaches are best suited to documents, such as photographs, that consist mainly of continuous-tone images. In contrast, the vast majority of reproduced documents consist mainly of text, so workers in this field have proposed other techniques, which take advantage of such documents' textual nature. For example, one technique embeds information by making slight variations in inter-character spacing. Such approaches are desirable because they lend themselves to embedding of significant amounts of information with essentially no effect on document appearance.

SUMMARY OF THE INVENTION

But we have recognized that such approaches are not well suited to use by photocopiers, which do not receive the related word-processor output and thus may not be able to identify actual text characters reliably. And we have developed a technique that exhibits text-based approaches' advantages in a way that is more flexible than traditional approaches.

Specifically, we identify (typically, sub-character-sized) regions that consist mainly of pixels that meet certain criteria typical of text-character parts, and we embed the intended message by selectively darkening regions thus identified. Although this approach depends on the existence of such regions, it is not dependent on reliably knowing those regions actually do contain character parts. It can therefore be employed advantageously by photocopiers. Moreover, since the darkness variations in which the message is embedded occur in regions that are parts of text characters or, in any event, are very much like them, the variations can be significant from a machine point of view, but do not affect the documents' appearance to a human reader.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
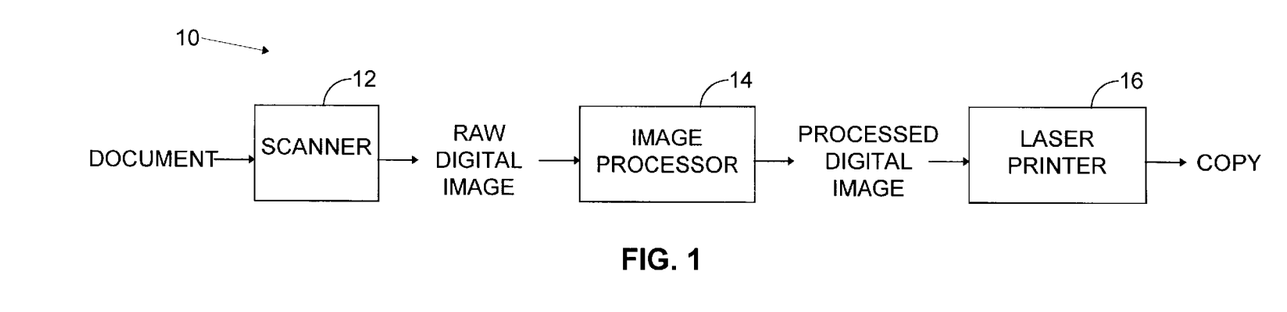
FIG. 1 is a block diagram depicting a photocopier in which the present inventions' teachings can be employed.

FIG. 1 depicts a photocopier 10 of the type in which the present invention's teachings can be employed. An optical scanner 12 generates as its output electrical signals that digitally represent an image of the document that it has scanned optically. The digital representation may be gray-scale or color, but each pixel value should consist of one (in the case of gray scale) or more (typically three or four in the case of color) multiple-bit components. A typical value resolution is eight bits per component per pixel.

An image processor 14 performs a number of operations, such as text enhancement, color correction, and, in accordance with the present invention, hidden-information embedding. A printer 16 receives electrical signals digitally representing the image as thus processed and renders this image on a copy document. The printer 16 is typically, but not necessarily, a laser printer. It must have multiple-bit-per-scanner-pixel value resolution for each component. This can be achieved by affording multiple-bit-per-printer-pixel value resolution and/or by affording a spatial resolution that exceeds the scanner's.

Figure 2:
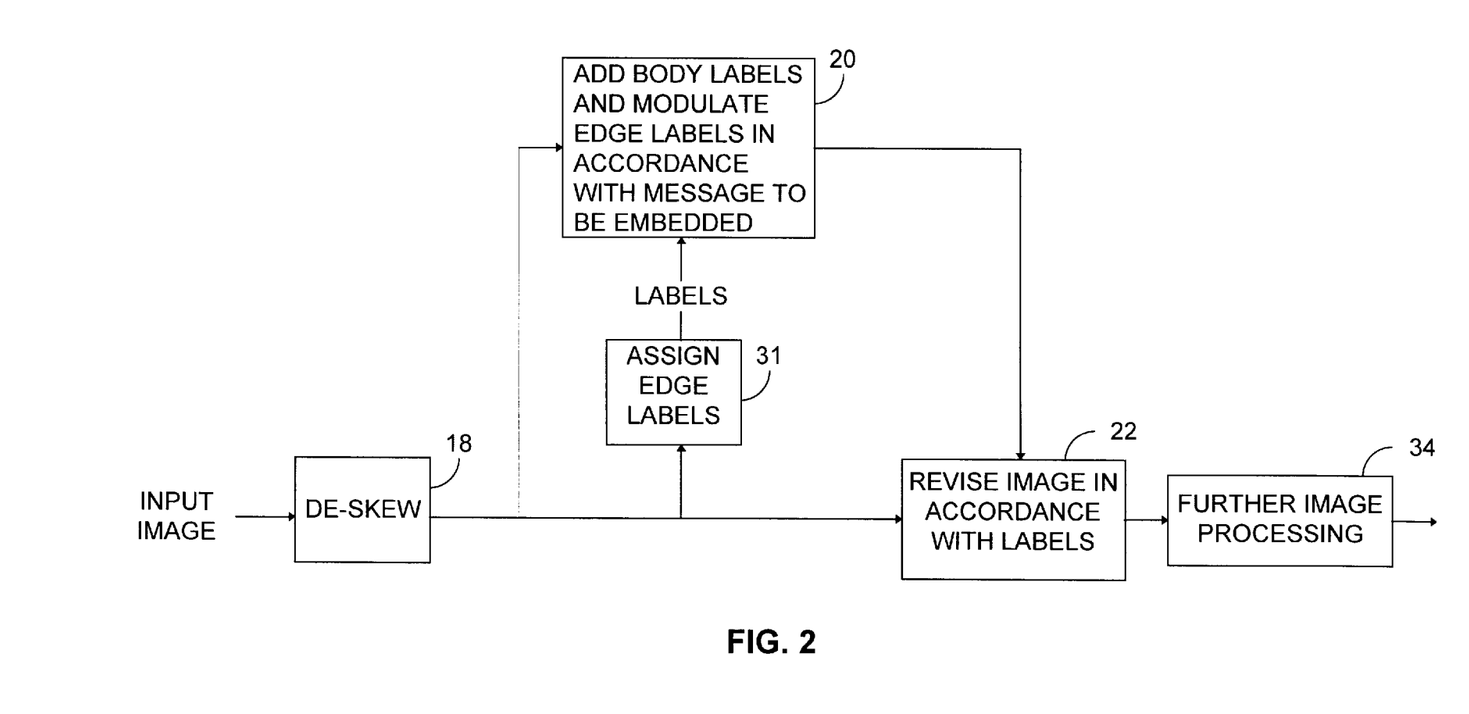
FIG. 2 is a block diagram of an exemplary set of operations that the photocopiers' image processor may perform.

The image processors in photocopiers that employ the present invention's teachings can vary widely, but FIG. 2 depicts an exemplary set of functions that such an image processor may perform. Block 18 represents an operation in which the image processor re-orients text that is canted because, e.g., the original document was oriented improperly on the scanner. Specifically, the image processor generates an image whose pixel values it calculates by so interpolating among the input image's pixel values that the resultant, de-skewed image's pixel rows are parallel to the image text rows. Blocks 20 and 22 represent operations by which, in accordance with the present invention, the image processor identifies text regions and embeds information in them by modulating their darknesses.

Figure 3:
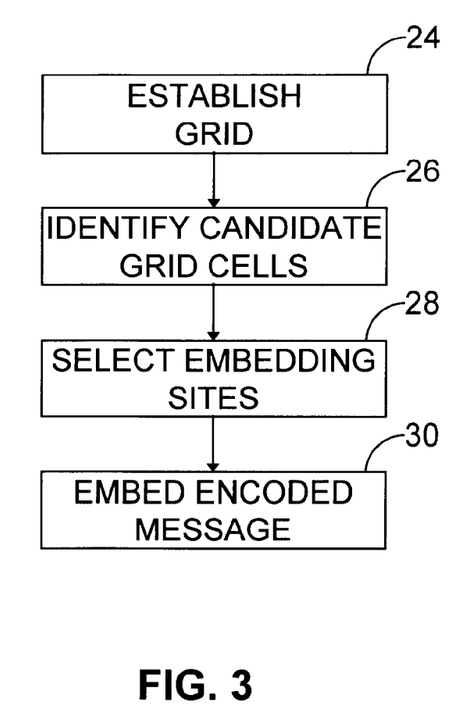
FIG. 3 is a block diagram that depicts in more detail FIG. 2's operation of making label changes in accordance with the message to be embedded.

FIG. 3 is an overview of the block 20's operation. That drawing's block 24 represents dividing the image into multiple-pixel grid cells, and its block 26 represents identifying cells whose contents are predominately parts of text characters, as will be described in more detail presently. From among the text cells thus identified, the image processor selects cells to be used for embedding information.

As block 28 indicates, the image processor associates the cells thus selected with respective binary values of the message to be embedded. The intensities of the input image's text-region pixels are low but not ordinarily maximum black. Block 30 represents embedding the message by selectively replacing those text pixels' values with, say, maximum black in accordance with a bit stream that represents the message.

Figure 4:
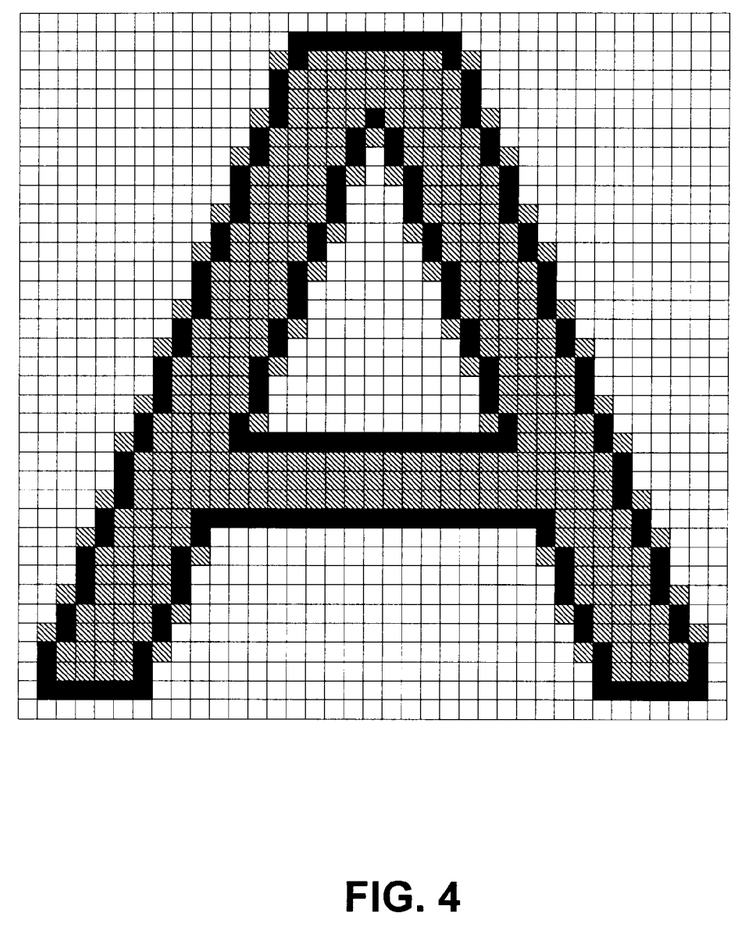
FIG. 4 is a diagram that illustrates character outlining that photocopiers employing the present invention's teachings may perform.

This operation may cooperate with other image-processor operations. For instance, there may be a text-enhancement operation that includes a step, represented by FIG. 2's block 31, of assigning edge labels in preparation for enhancing text characters' legibility by blackening their outlines. In FIG. 4 the cross-hatched pixels are those that are dark enough to be considered text regions, and the pixels with the black fill represent those that FIG. 2's step 31 has identified as meeting certain criteria that it associates with text edges. A commonly assigned U.S. patent application of Ancin et al. for Text Enhancement for Color and Gray-Scale Documents, identified by Epson file no. AP054 and filed on the same date as this application, describes a technique for assigning such labels, and we hereby incorporate that application by reference. The value of any pixel to which such labels remain assigned after label-changing operations described below will be replaced with a predetermined, typically maximum-black, value.

FIG. 2's step 20 supplements and modulates this operation's output. Specifically, that step embeds its information, as was just explained, by additionally labeling some of the text character's interior pixels for similar darkening. Conversely, if one of the pixels labeled an edge in step 31 is located within one of the embedding sites but the embedded message's value for that site dictates that the site not be darkened, step 20 removes the label that step 31 assigned.

Figure 5:
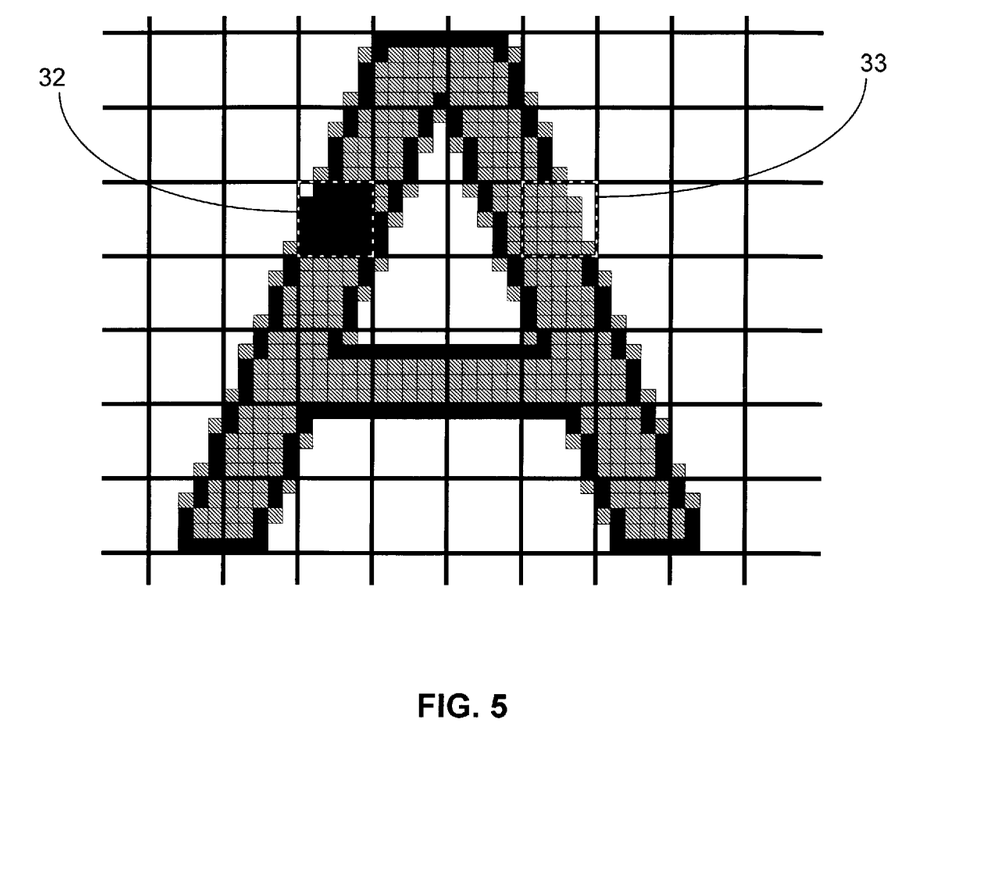
FIG. 5 is a diagram similar to FIG. 4 but illustrating the results of modulating label assignment in accordance with the message to be embedded.

For example, suppose that FIG. 5's (5×5) cells 32 and 33 are selected as embedding sites. Suppose further that the encoding scheme requires two such sites to embed a single bit: a darkened site followed by one that is not darkened will represent a binary 1, while a non-darkened site followed by a darkened site represents a binary 0. To embed a binary 1, all pixels in cell 32 that had been identified as text-region pixels are set to maximum black in FIG. 2's operation 22. Conversely, none of the pixels in cell 33 that had been identified as text-region pixels is set to maximum black, not even those that, as FIG. 4 illustrated, had initially been designated by FIG. 2's operation 31 as text-edge pixels. Cell 33's text pixels would instead remain unchanged—except possibly by unrelated further processing, such as color correction—in some embodiments. In others, they would be distinguished in some other way, such as by being set to a predetermined lighter value or lightened by a predetermined amount.

The image as thus revised is typically subjected to further processing, as FIG. 2's block 34 indicates, but the processing is so performed as to preserve the embedding sites' darkness modulation.

We now turn to the way in which the cell grid is defined. This operation begins by considering the image as a whole. For this purpose, it is beneficial to employ a low-resolution rendition of the image. In some embodiments the low-resolution scan can be performed optically. For instance, FIG. 1's scanner 12 may be, say, a 300-dot-per-inch ("dpi") scanner whose optics can be momentarily adjusted to take an initial, 100-dpi scan. In other cases, the high-resolution output of a fixed-resolution scanner can be low-pass filtered electronically and result re-sampled at the lower resolution.

From this image, the image processor identifies (low-resolution) pixels considered to be located in text regions. The criterion for identifying such pixels in gray-scale-only images may be that their brightnesses must be less than a certain threshold. That threshold may be fixed, or it may be arrived at by taking a histogram of the image's pixel values and selecting all those whose brightnesses are below, say, the 25th percentile. If the image is a color image, the system would typically impose a further requirement that the color saturation be below a certain threshold. Again, the threshold may be fixed, or it can be derived from, say, histogram values. Also, the saturation threshold applied to a given pixel may depend on that pixel's intensity. Other criteria, too, can be used to select text regions.

Figure 6:
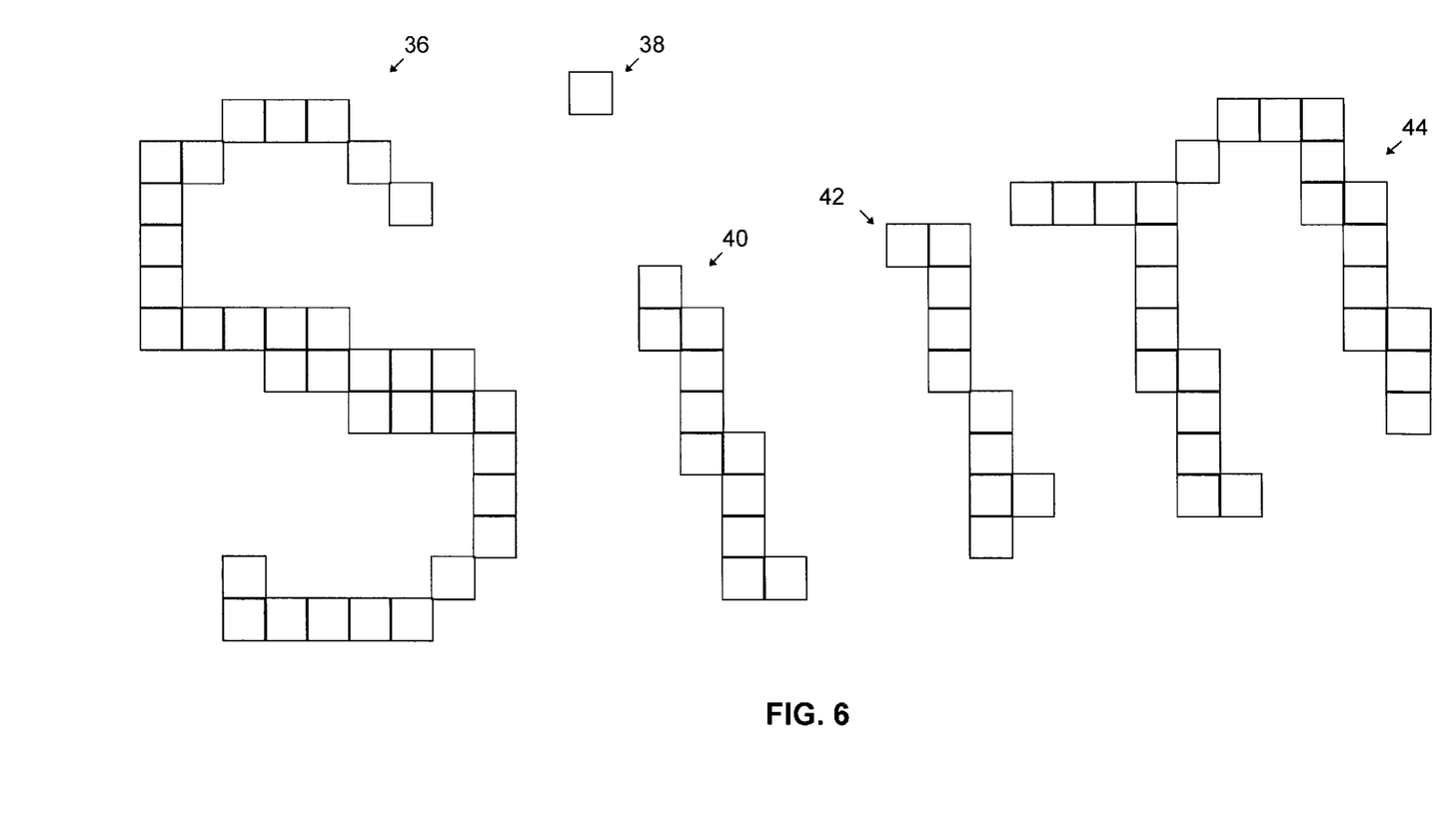
FIG. 6 is a diagram that illustrates low-resolution text-pixel identification.

The result will be a pattern of pixels that meet the criteria. For instance, FIG. 6 illustrates a pattern that can result from the three-letter sequence "Sim." The pixels thus identified are divided into sets of contiguous pixels. FIG. 6 depicts five such sets 36, 38, 40, 42, and 44. These sets, or "components," as we refer to them, correspond roughly to individual characters. But a pair of characters can be close enough to result in a single component. And FIG. 6 illustrates that an individual character can result in more than one component: The "i" results in two components 38 and 40, while the "m" results in two components 42 and 44. This is acceptable because the purpose for grouping text-region pixels into components is not to identify characters but rather to provide input into a repeatable way of establishing a reference position. Still, components consisting of fewer than eight pixels are not used in further processing, nor are components that are more than two-hundred pixels wide or fifty pixels high.

Figure 7:
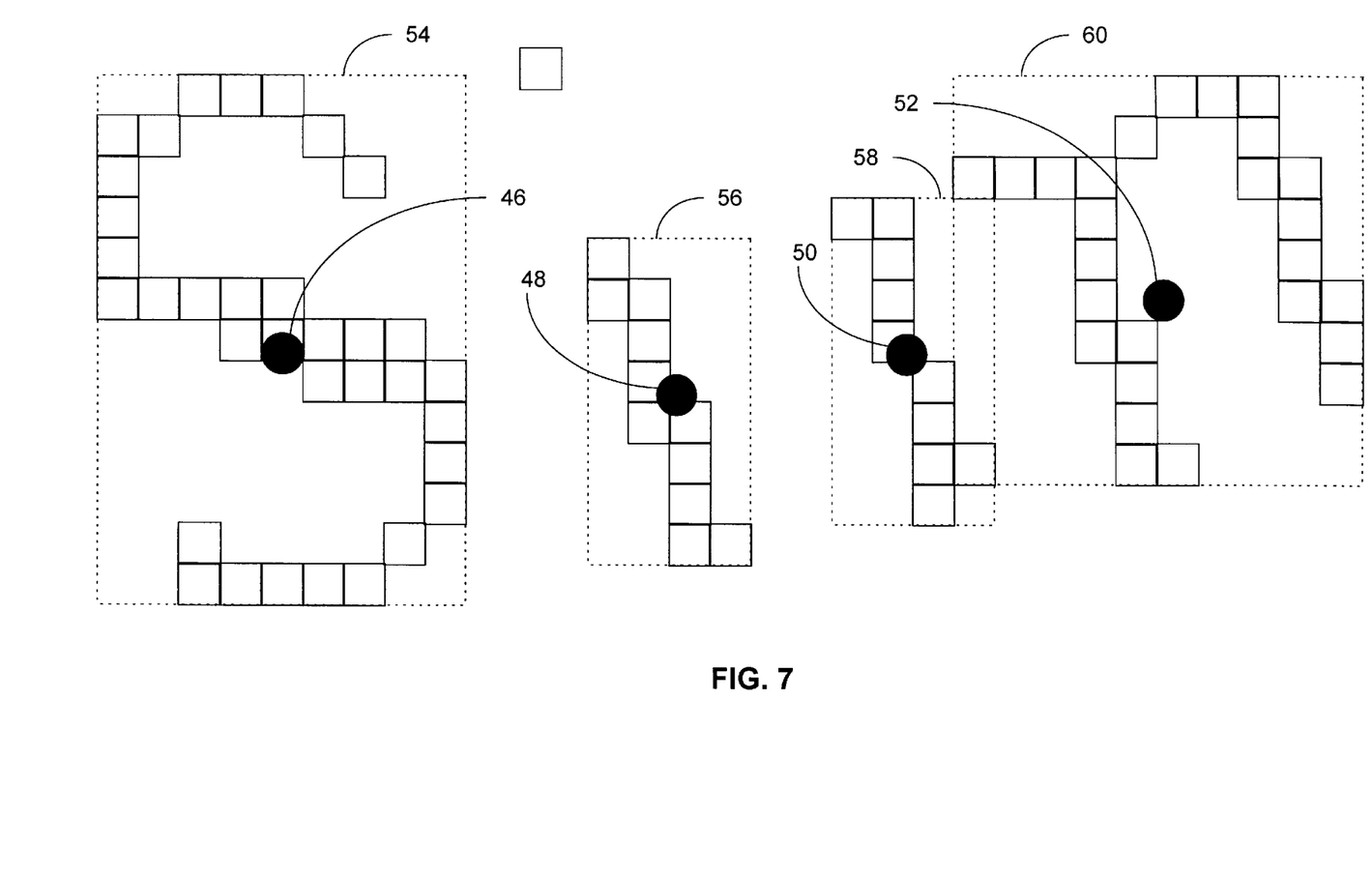
FIG. 7 is a similar diagram depicting centroids of connected sets of such pixels.
Figure 8:
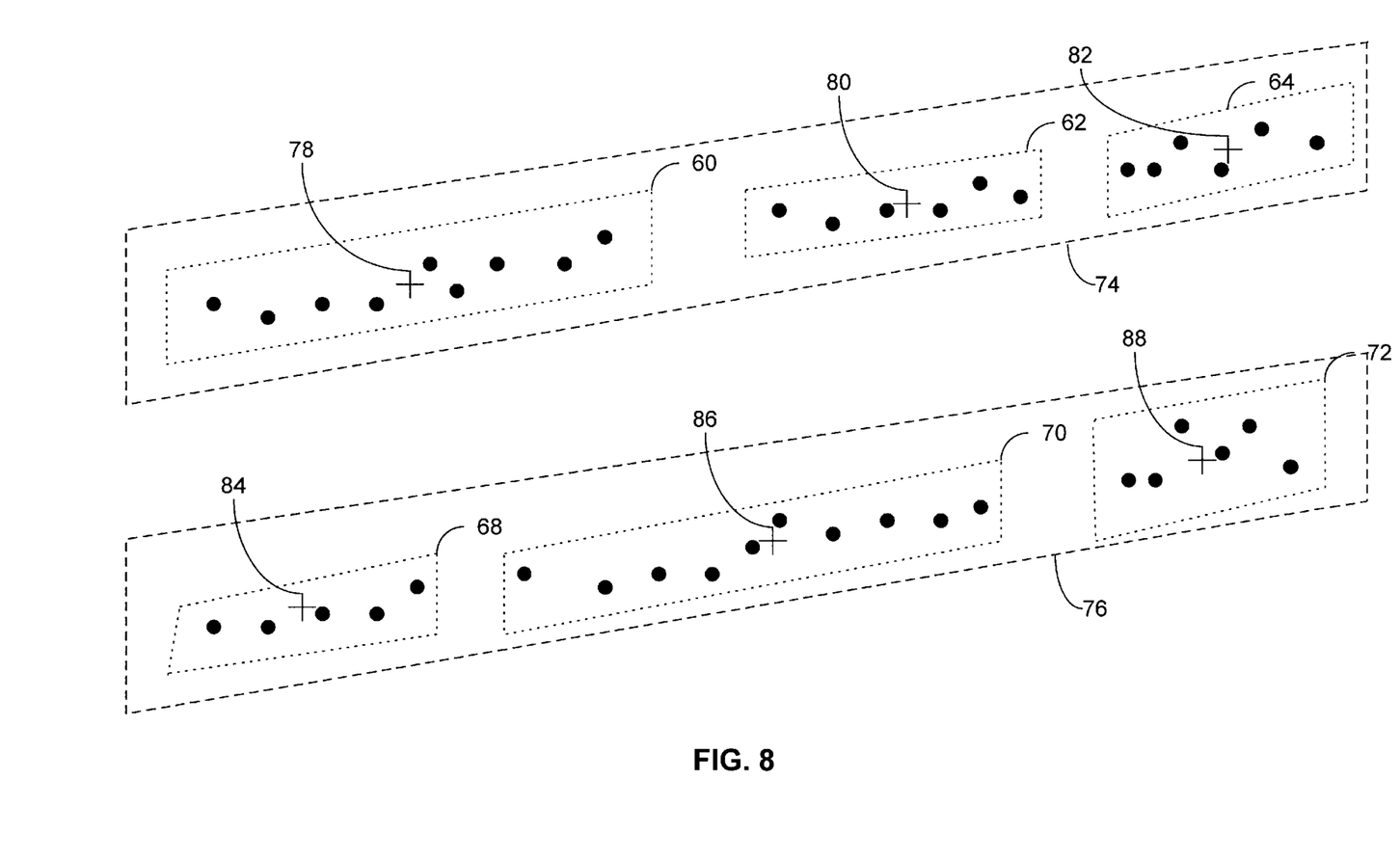
FIG. 8 is a diagram of those centroids' grouping into word- and line-sized sets.

As FIG. 7 illustrates, the image processor then determines the (sub-pixel-resolution) centroids 46, 48, 50, and 52 of the remaining components' respective smallest enclosing rectangles 54, 56, 58, and 60. As FIG. 8 illustrates, those centroids are then grouped into sets 60, 62, 64, 68, 70, and 72 of centroids spaced from adjacent centroids in the set by less than a minimum inter-word spacing. That minimum spacing usually bears a predetermined ratio to the average size of the component bounding boxes. We refer to these sets as "words" because they usually do correspond to actual text words, although the correspondence is not always exact. These word sets are then divided into groups 74 and 76 of word sets separated from their neighbors by less than a minimum inter-line spacing. Although the correspondence of components to text characters is somewhat rough, the correspondence of the thus-derived word sets to actual words is less so, and the correspondence of line sets of those centroids to text lines is ordinarily quite good in the following sense: although the spacings between words in a line of actual text will occasionally be so great as to result in two lines sets of centroids, separate text lines will nearly always result in separate line sets.

With the line sets thus determined, word centroids 78, 80, 82, 84, 86, and 88 are computed from each respective word sets' constituent component centroids. As FIG. 9 illustrates, the image processor then computes the lines that have the best least-squares fits to respective line sets' word centroids.

Figure 9:
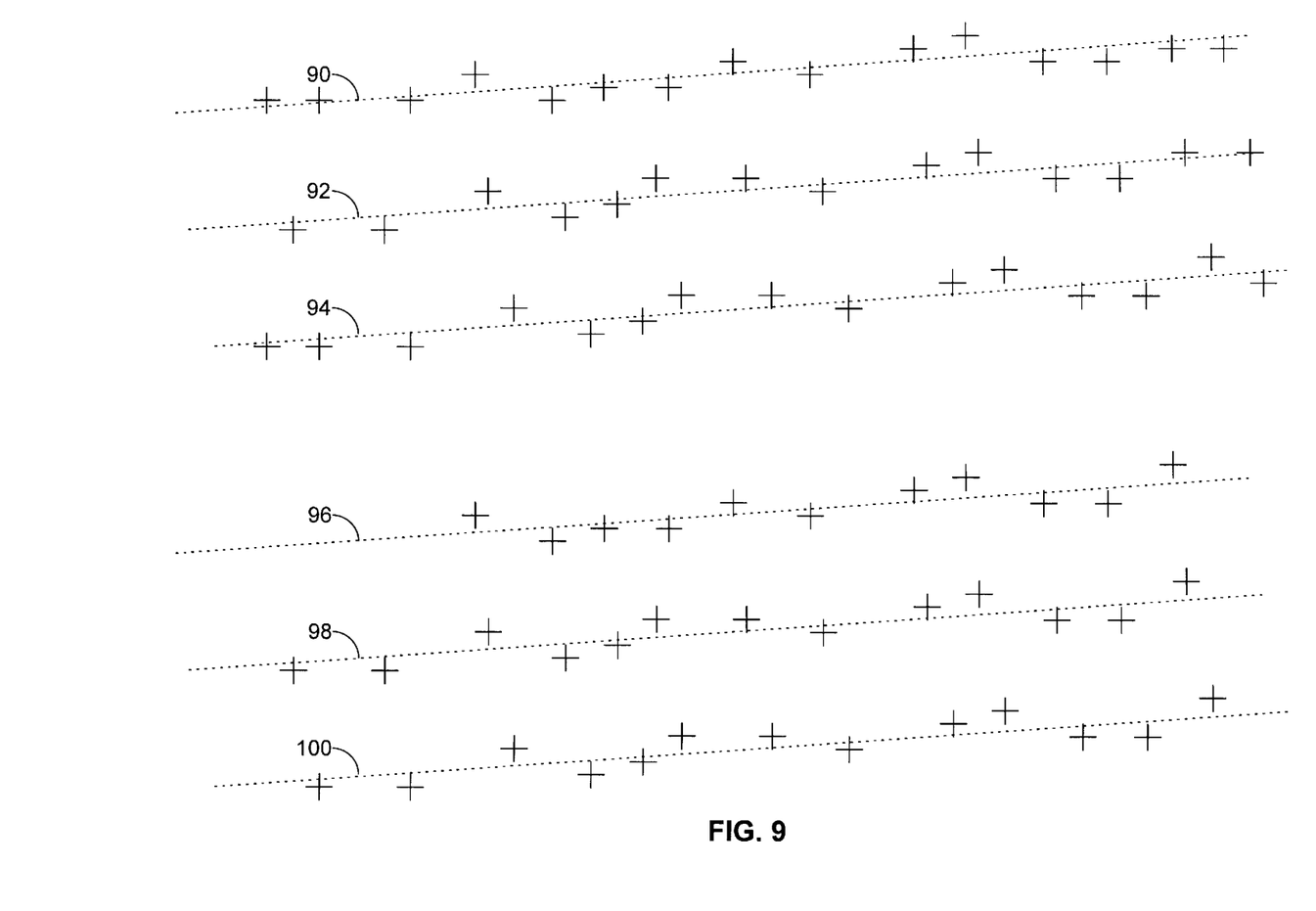
FIG. 9 is a diagram depicting lines having the best least-squares fits to line-sized centroid sets.

As FIG. 9 suggests, there may be a non-zero skew angle between the lines thus determined and the input scan lines. If so, conventional multirate digital-processing techniques are employed to generate the values of pixels arrayed in rows parallel to the least-squares-fit lines thus determined. Actually, this de-skewing may be performed in a two-step process. In the first step, the re-sampling may occur as just described. In the second step, new lines are computed that represent the best least-squares fit through the bottoms of the resultant component positions. Then the data are again re-sampled to generate the values of pixels disposed in rows parallel to the newly computed lines.

With the image now de-skewed the image processor computes line segments de-limited by the end component centroids in respective line sets. Each line segment that is spaced by more than a predetermined inter-paragraph minimum from the preceding line, or that is indented by more than a predetermined minimum indentation from its fellows, is considered to begin a new paragraph, so the line segments are divided into paragraph sets exemplified by FIG. 10's sets 102, 104, 106, and 108.

Figure 10:
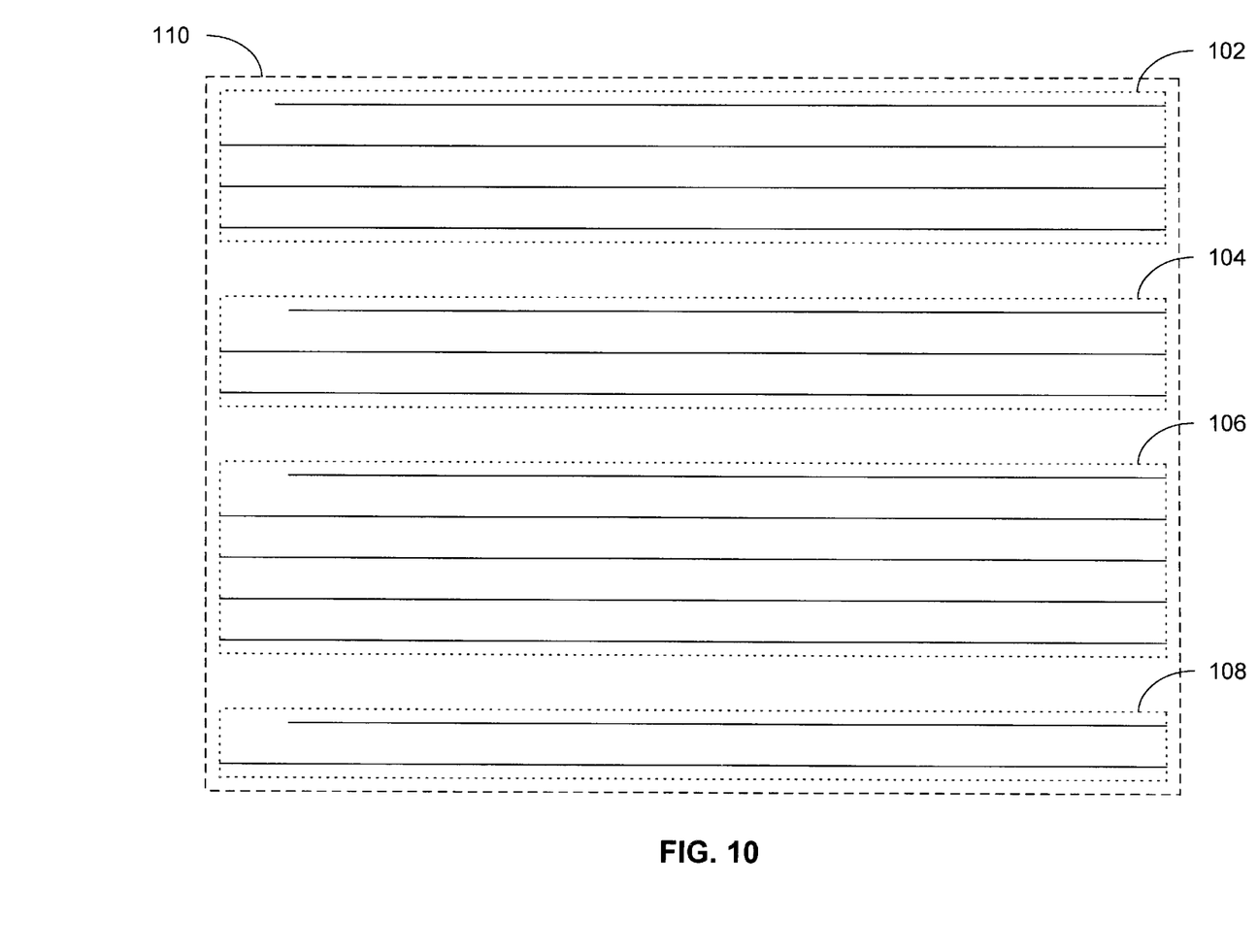
FIG. 10 is a diagram illustrating a bounding box by which the photocopiers' image processor establishes a grid of cells.

It turns out that the process just described of locating paragraphs in this manner is quite repeatable, and so the embedding operation described above establishes the origin of its grid system at the upper left corner of the smallest rectangle 110 that includes all of the paragraph line-segments sets thus determined. Actually, the process of identifying the paragraphs is superfluous as far as the grid-origin determination is concerned: it can equivalently be determined from the smallest box that bounds the line segments. But the paragraph identification can be used for other purposes, as will be explained below.

Whereas the de-skewing and origin-establishing operations described so far were performed with a low (e.g., 100 dpi) pixel resolution to reduce computational overhead, the image's original, high-resolution image data are now re-sampled with line scans oriented in accordance with the de-skewing operation described above, and the resultant pixel values are divided into 5×5 cells beginning at the just-determined origin. With a grid thus determined, the image processor embarks upon a message-embedding operation depicted in FIG. 11.

Figure 11:
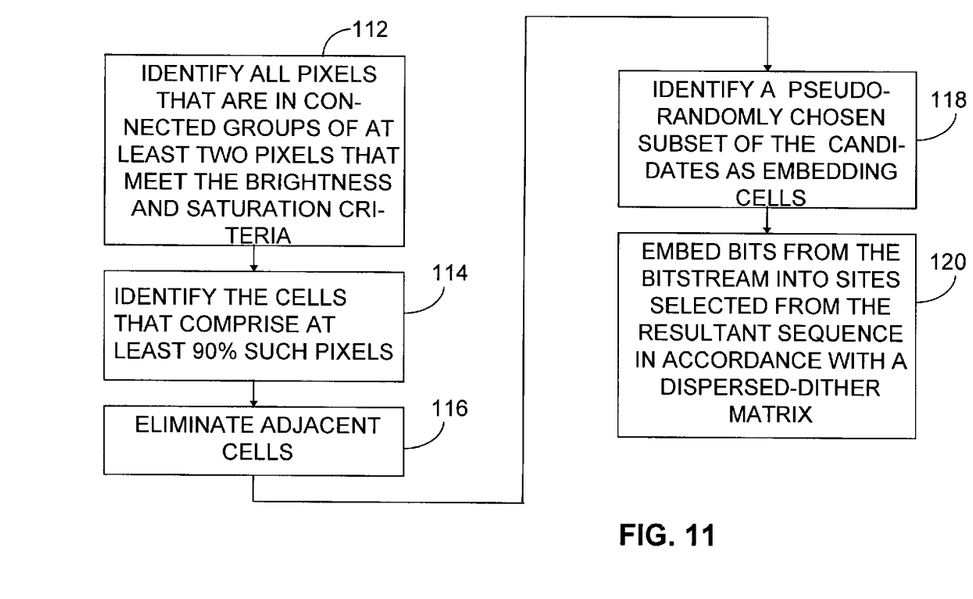
FIG. 11 is a block diagram of the process for selecting from among those cells and embedding information in the cells thus selected.

The original binary message will ordinarily have been provided with error correction code, and it is the resultant bit stream that the image processor embeds in accordance with FIG. 11's procedure. First, the image processor identifies all pixels that meet certain criteria consistent with their being part of a text region. Typically, the criteria are that the pixel's brightness and, if it is color image, saturation are below respective predetermined thresholds.

The thresholds can be fixed, or they can be determined from the image contents in various ways. One way, for instance, is to employ the text-edge labeling that results from FIG. 2's operation 31. In accordance with that approach, the image processor computes histograms of all such pixels' brightnesses and saturations, and it determines the thresholds accordingly. For instance, the brightness and saturation thresholds may be placed at, say, the respective histograms' 95th percentile. Alternatively, the threshold employed may be a weighted average of the saturation and brightness so chosen that the criterion is met by, say, 95% of the edge-labeled pixels. Clearly, other approaches can be used as well.

The image processor then proceeds to an operation, represented by FIG. 11's block 114, in which the processor identifies all of the 5×5 cells in which at least, say, 90% of the pixels meet the text-indicating criteria. From the set of cells thus identified, the processor eliminates enough cells to prevent any cells in the set from being adjacent to each other. This is advantageous when the embedded message is to be recovered, because it reduces the likelihood of the cross-talk between adjacent embedding cells that can result from slight misregistrations between embedding and recovery sites. Block 116 represents eliminating those cells.

The remaining cells are the candidate cells referred to in FIG. 3's block 26, and the next task is to select from among these candidate cells the ones that will be employed for embedding. The candidate cells can be numbered in the order of their occurrence from left to right and top to bottom. In order to suppress visual effects that can result from any periodicity in the candidate cells, the processor employs this numbering and a pseudo-random sequence to select those that will qualify as sites for embedding. The same pseudo-random sequence can be employed every time the embedding procedure is employed. Alternatively, a seed placed in or derived from the document in some manner can be used to initialize a pseudo-random-sequence generator available to both the embedding party and the recovering party. For example, the seed may be the number of paragraph sets determined in the grid-establishing operation, or the initial part of the sequence may always be the same and be used to embed the seed for pseudo-random generation sequence or the rest of the sequence.

As FIG. 11's block 120 indicates, image processor uses a so-called dispersed-dither matrix to determine the order in which it uses the selected cells to embed the message's successive bits. Dither-matrix elements are numerical values that, being matrix elements, occupy respective rows and columns. So each element can be thought of as having a spatial distance from each other element. Such matrices are well known in printing for performing electronic half-toning. What distinguishes a dispersed-dither matrix is that elements tend to be relatively distant from each other in matrix position if they are close to each other in value. Such matrices are widely used for electronic half-toning, but we use them here for a different purpose.

Let us assume that the matrix-element values are all the integers from zero to some positive value M. To embed the bit stream's first bit, the processor finds the dither-matrix location that contains a zero, since that is the lowest matrix-element value. Suppose that the zero is in the fifth location in the dither matrix's tenth row and the system employs two sites to embed each bit. Then the system will embed the bit in fifth selected-site pair in the tenth site row. If there is no fifth site pair in that row, then the processor proceeds to the dither-matrix location containing a one. Otherwise, it attempts to embed the second bit in the site pair whose position corresponds to the dither-matrix location that contains the value one. This continues until all of the bits have been embedded. By so dispersing the encoding, the recovery process is made relatively robust to "burst" errors, which could occur as a result of a coffee spill, for instance.

To recover the information, the copy is scanned and embedding sites identified just as they are in the embedding operation, and the embedded information is then recovered by observing the darkness variations at the sites thus identified. But some embodiments may employ enhancements to add repeatability and robustness. For example, although the cells must have the same (e.g., five-pixel) pitch as in the embedding operation, cell darknesses may be based on overlapping cells that are, say, 7×7 to make the procedure more tolerant of misregistrations between embedding and recovery. Alternatively, or in addition, the embedding-site identification may be repeated several times, one time based on the grid layout determined as described above and other times based on grids spaced from the original by one or two pixels in each direction. Since the message will contain error-correction coding or other redundancy, the correct message can be identified if the results differ.

The message to be embedded can be of any type that the photocopier manufacturer or owner desires. For example, it may include the date on which the copy was made and the photocopier's make and serial number. Typically, the method for recovering the raw message will be publicly available, but the raw message may be encrypted so as to be decipherable by only the manufacturer or only the owner.

One interesting use of the embedding process is additionally to include verification information. This becomes valuable in the following scenario. Suppose that a standard method of embedding and extracting information in accordance with the above approach is publicly known. Suppose further that a photocopier's manufacturer or owner—which we will call the "prover"—contends that it was the prover who embedded the recovered message and can thus interpret it authoritatively. One approach to proving the prover's legitimacy is to adapt one of the known zero-knowledge interrogation techniques described, for example, in Goldwasser, "The Knowledge Complexity of Interactive Proof Systems," *Proc. STOC* 1985.

Figure 12A:
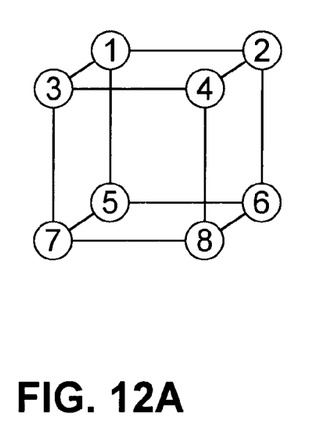
FIGS. 12A and 12B are conceptual graph diagrams employed to explain a verification technique to which the invention's teachings lend themselves.

One such technique involves the use of "permutation matrices" to generate "isomorphic graphs." In this context, a graph is a group of nodes and connecting edges, as FIG. 12A illustrates. For present purposes, the various nodes' spatial positions are not particularly of interest; for present purposes the graph is simply a list of edge-connected node pairs. (We impose the requirement that it has no isolated nodes: each node is connected to at least one other node.) So we can represent FIG. 12A's graph simply as the following matrix $G_1$, in which each row is an (unordered) pair of connected nodes:

$$G_1 = \begin{bmatrix} 1 & 2 \\ 1 & 3 \\ 1 & 5 \\ 2 & 4 \\ 2 & 6 \\ 3 & 4 \\ 3 & 7 \\ 4 & 8 \\ 5 & 6 \\ 5 & 7 \\ 6 & 8 \\ 7 & 8 \end{bmatrix} \quad (1)$$

Figure 12B:
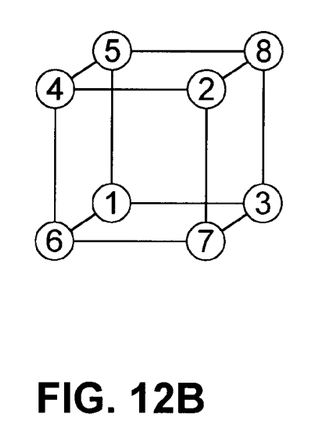

One can readily include such a representation in an embedded message. Of course, FIG. 12A's node numbering is purely arbitrary; one could re-number the nodes as FIG. 12B illustrates and represent the same topology with:

$$G_2 = \begin{bmatrix} 1 & 3 \\ 1 & 5 \\ 1 & 6 \\ 2 & 4 \\ 2 & 7 \\ 2 & 8 \\ 3 & 7 \\ 3 & 8 \\ 4 & 5 \\ 4 & 6 \\ 5 & 8 \\ 6 & 7 \end{bmatrix}.$$

$G_1$ and $G_2$ are isomorphic: although they use different labels, they represent the same topology.

To express the relationship between two isomorphic graphs, we introduce the notation $G_2 = P \cdot G_1$, where $P \equiv [a \ b]$, a and b are equal-sized column vectors, no column-vector element is repeated in the same vector, a includes every element of $G_1$, and the operator "·" in the foregoing notation means that $G_2$ is the result of replacing each element of a in $G_1$ with the corresponding element of b. We refer to matrix P as the permutation matrix that relates the two isomorphic graphs. The permutation matrix that defines the relationship between the graphs $G_1$ and $G_2$ of FIGS. 12A and 12B is:

$$P = \begin{bmatrix} 1 & 5 \\ 2 & 8 \\ 3 & 4 \\ 4 & 2 \\ 5 & 1 \\ 6 & 3 \\ 7 & 6 \\ 8 & 7 \end{bmatrix}. \quad (3)$$

Now, it is a simple matter to produce an arbitrary permutation matrix and employ it to generate a second graph isomorphic to a first graph: the computational complexity of doing so increases only linearly with the number of nodes. But the converse problem, i.e., that of determining the permutation matrix that relates two given isomorphic graphs, can be more difficult. If the graphs are non-planar—i.e., if they cannot be drawn in a plane without intersecting edges—the task of determining the permutation matrix soon becomes computationally intractable as the numbers of nodes and connections increase. (Although the graphs of FIGS. 12A and 12B are so drawn as to suggest a three-dimensional relationship, the same number of coplanar nodes can be so laid out that none of the specified edges intersect. But it is a simple matter to guarantee that a graph is non-planar: a graph in which at least six nodes form a completely connected subset is necessarily non-planar.)

The verification technique is based on this complexity. It assumes a secret permutation matrix $P_p$ known only to the prover. If the document contains representations of two isomorphic graphs related by $P_p$, the prover can show itself to be their source—as well as the source of any accompanying embedded information—by proving possession of $P_p$.

But proving possession of $P_p$ by disclosing it would be undesirable; the matrix then would no longer be secret and thus no longer useful. So the prover instead employs an indirect method, one that involves preparing a new permutation matrix $P_t$ and generating a test graph $G_t = P_t \cdot G_2$.

Specifically, the prover gives $G_t$ to the "verifier"—i.e., to the entity to which the prover needs to prove authenticity—and then demonstrates that it can produce not only $P_t$ such that $G_t=P_t\cdot G_2$ but also another permutation matrix $P_t'$ such that $G_t=P_t'\cdot G_1$. This would be computationally impractical for someone not in possession of $P_p$. But it is easy for someone who knows $P_p$, because $P_t'=[a_p P_t\cdot b_p]$.

On the other hand, showing the verifier both $P_t$ and $P_t'$ is undesirable because one can readily derive the secret permutation matrix $P_p$ from the test permutation matrices $P_t$ and $P_t'$. Instead, the process is repeated—i.e., the prover produces n test graphs and answers the corresponding challenge n times—but the verifier can ask only for $P_t$ or $P_t'$ in any iteration; it cannot ask for both in the same iteration.

Now, correctly producing the requested permutation matrix once is not by itself a reliable indication of the prover's authenticity, since a prover not in possession of the secret permutation matrix can generate the test graph from either $G_1$ or $G_2$ and have a fifty-fifty chance that the chosen graph will be the one to which the verifier will ask the test graph's relationship. But a false prover's chance of passing all challenges is only $2^{-n}$ if the process is repeated n times.

The entity that embeds the information does not have to include both graphs in the message. For example, one of the graphs can be one that the embedder publicly advertises as a graph that it will use for the purpose. Or the graph can be derived from the (non-embedded) document contents. For example, text components identified as described above in connection with FIG. 7 can be numbered in accordance with a publicly known scheme—e.g., they could be numbered in the order in which they are identified—and there could be some publicly known scheme for determining the connections. One approach may be that, say, the numbers associated with all components in the same paragraph would be considered connected to each other, while, say, all of the even-numbered nodes from even-numbered paragraphs would be considered connected to the odd-numbered nodes in odd-numbered paragraphs. Another approach would be that, say, all nodes corresponding to components from "words" consisting of certain numbers of components would be considered connected to each other and to selected nodes corresponding to components of other-sized words. Other ways to classify nodes for connection could also be used.

The invention takes advantage of the text-document capabilities yet is well suited to use by copiers. It thus constitutes a significant advance in the art.

What is claimed is:

1. For embedding a message in a document, a method comprising the steps of:
    A) providing an electronically stored source image;
    B) performing a sequence of at least one image-revision step, in which sequence each image-revision step receives a respective input image version consisting of input pixels and produces therefrom an output image version consisting of output pixels, the input image version of first image-revision step is the source image, the input image version of any subsequent image-revision step is the output image version of the preceding image-revision step, and one of the image-revision steps is an embedding operation comprising the steps of:
        i) selecting embedding sites in the embedding operation's input image version; and
        ii) selectively setting values of the embedding sites to a predetermined dark value in accordance with contents of the message to be embedded; and
    C) printing the image that the output image version of the last image-revision step represents; and wherein the step of selecting embedding sites comprises the steps of:
    identifying, in the embedding operation's input image version, candidate sites whose pixel values in a given one said image version meet predetermined text-region-indicating criteria; and
    selecting at least some of the candidate sites as embedding sites.

2. A method as defined in claim 1 wherein:
the step of identifying candidate sites comprises dividing the image into a grid of cells; and
each candidate site consists of a group of pixels meeting a set of at least one text-pixel-indicating criterion in a cell meeting a set of at least one candidate-cell-indicating criterion.

3. A method as defined in claim 2 wherein one said text-pixel-indicating criterion is that the pixel's brightness is less than a brightness threshold.

4. A method as defined in claim 3 wherein one said text-pixel-indicating criterion is that the pixel's saturation is less than a saturation threshold.

5. A method as defined in claim 3 wherein one said candidate-cell-indicating criterion is that at least a predetermined minimum percentage of the pixels in the cell meet the set of at least one text-pixel-indicating criterion.

6. A method as defined in claim 2 wherein one said candidate-cell-indicating criterion is that at least a predetermined minimum percentage of the pixels in the cell meet the set of at least one text-pixel-indicating criterion.

7. A method as defined in claim 2 wherein the step of dividing the image into a grid comprises positioning the grid in accordance with the contents of the image.

8. A method as defined in claim 7 wherein the step of positioning the grid comprises identifying features in the image that meet predetermined feature criteria and positioning the grid by reference to the smallest rectangle that bounds the features thus identified.

9. A method as defined in claim 1 wherein the step of selecting embedding sites comprises selecting a subset of the candidate sites in accordance with a pseudorandom sequence.

10. A method as defined in claim 1 wherein:
the message is a sequence of bits; and
the step of selectively setting the values of the embedding sites comprises:
    associating each bit with a pair of embedding sites;
    setting the first but not the second site of a pair to the predetermined dark value if the bit associated therewith has one binary value; and
setting the second but not the first site of a pair to the predetermined dark value if the bit associated therewith has the other binary value.

11. A method as defined in claim 10 wherein the step of selectively setting the values of embedding sites comprises leaving unchanged the sites not set to the predetermined dark value.

12. A method as defined in claim 1 wherein:
the message is a sequence of bits; and
the step of selectively setting the values of the embedding sites comprises:
    associating each bit with a group of three embedding sites;
    setting the second but not the first or third sites of a group of three to the predetermined dark value if the bit associated therewith has one binary value; and
    setting the first and third sites but not the second site of a group of three to the predetermined dark value if the bit associated therewith has the other binary value.

13. A method as defined in claim 1 wherein the step of providing the electronically stored image comprises scanning a document optically and electronically storing the resultant image.

14. A storage medium containing instructions readable by a computer to configure the computer to function as an image processor for:
A) receiving signals representing a source image;
B) performing a sequence of at least one image-revision step, in which sequence each image-revision step receives a respective input image version consisting of input pixels and produces therefrom an output image version consisting of output pixels, the input image version of the first image-revision step is the source image, the input image version of any subsequent image-revision step is the output image version of the preceding image-revision step, and one of the image-revision steps is an embedding operation comprising the steps of:
  i) selecting embedding sites in the embedding operation's input image version; and
  ii) selectively setting the values of the embedding sites to a predetermined dark value in accordance with the contents of a message to be embedded; and
C) generating electrical signals representing the output image version of the last image-revision step; and
wherein the step of selecting embedding sites comprises the steps of:
  identifying, in the embedding operation's in-put image version, candidate sites whose pixel values in a given one said image version meet predetermined text-region-indicating criteria; and
  selecting at least some of the candidate sites as embedding sites.

15. A storage medium as defined in claim 14 wherein:
the step of identifying candidate sites comprises dividing the image into a grid of cells; and
each candidate site consists of a group of pixels meeting a set of at least one text-pixel-indicating criterion in a cell meeting a set of at least one candidate-cell-indicating criterion.

16. A storage medium as defined in claim 15 wherein one said text-pixel-indicating criterion is that the pixel's brightness is less than a brightness threshold.

17. A storage medium as defined in claim 16 wherein one said text-pixel-indicating criterion is that the pixel's saturation is less than a saturation threshold.

18. A storage medium as defined in claim 16 wherein one said candidate-cell-indicating criterion is that at least a predetermined minimum percentage of the pixels in the cell meet the set of at least one text-pixel-indicating criterion.

19. A storage medium as defined in claim 15 wherein one said candidate-cell-indicating criterion is that at least a predetermined minimum percentage of the pixels in the cell meet the set of at least one text-pixel-indicating criterion.

20. A storage medium as defined in claim 15 wherein the step of dividing the image into a grid comprises positioning the grid in accordance with the contents of the image.

21. A storage medium as defined in claim 20 wherein the step of positioning the grid comprises identifying features in the image that meet predetermined feature criteria and positioning the grid by reference to the smallest rectangle that bounds the features thus identified.

22. A storage medium as defined in claim 14 wherein the step of selecting embedding sites comprises selecting a subset of the candidate sites in accordance with a pseudo-random sequence.

23. A storage medium as defined in claim 14 wherein:
the message is a sequence of bits; and
the step of selectively setting the values of the embedding sites comprises:
  associating each bit with a pair of embedding sites;
  setting the first but not the second site of a pair to the predetermined dark value if the bit associated therewith has one binary value; and
  setting the second but not the first site of a pair to the predetermined dark value if the bit associated therewith has the other binary value.

24. A storage medium as defined in claim 23 wherein the step of selectively setting the values of embedding sites comprises leaving unchanged the sites not set to the predetermined dark value.

25. A storage medium as defined in claim 14 wherein:
the message is a sequence of bits; and
the step of selectively setting the values of the embedding sites comprises:
  associating each bit with a group of three embedding sites;
  setting the second but not the first or third sites of a group of three to the predetermined dark value if the bit associated therewith has one binary value; and
  setting the first and third sites but not the second site of a group of three to the predetermined dark value if the bit associated therewith has the other binary value.

26. A photocopier comprising:
A) an optical scanner for optically scanning a document and generating output signals representing a source image of the scanned document;
B) an image processor for performing a sequence of at least one image-revision step, in which sequence each image-revision step receives a respective input image version consisting of input pixels and produces therefrom an output image version consisting of output pixels, the input image version of the first image-revision step is the source image, the input image version of any subsequent image-revision step is the output image version of the preceding image-revision step, the image processor generates printer signals representing the output image version of the last image-revision step, and one of the image-revision steps is an embedding operation comprising the steps of:
  i) selecting embedding sites in the embedding operation's input image version; and
  ii) selectively setting the values of the embedding sites to a predetermined dark value in accordance with the contents of a message to be embedded; and
C) a printer responsive to the printer signals for printing the image that they represent; and
wherein the step of selecting embedding sites comprises the steps of:
  identifying, in the embedding operation's input image version, candidate sites whose pixel values in a given one said image version meet predetermined text-region-indicating criteria; and
  selecting at least some of the candidate sites as embedding sites.

27. A photocopier as defined in claim 28 wherein:
the step of identifying candidate sites comprises dividing the image into a grid of cells; and
each candidate site consists of a group of pixels meeting a set of at least one text-pixel-indicating criterion in a cell meeting a set of at least one candidate-cell-indicating criterion.

28. A photocopier as defined in claim 27 wherein one said text-pixel-indicating criterion is that the pixel's brightness is less than a brightness threshold.

29. A photocopier as defined in claim 28 wherein one said text-pixel-indicating criterion is that the pixel's saturation is less than a saturation threshold.

30. A photocopier as defined in claim 28 wherein one said candidate-cell-indicating criterion is that at least a predetermined minimum percentage of the pixels in the cell meet the set of at least one text-pixel-indicating criterion.

31. A photocopier as defined in claim 27 wherein one said candidate-cell-indicating criterion is that at least a predetermined minimum percentage of the pixels in the cell meet the set of at least one text-pixel-indicating criterion.

32. A photocopier as defined in claim 27 wherein the step of dividing the image into a grid comprises positioning the grid in accordance with the contents of the image.

33. A photocopier as defined in claim 32 wherein the step of positioning the grid comprises identifying features in the image that meet predetermined feature criteria and positioning the grid by reference to the smallest rectangle that bounds the features thus identified.

34. A photocopier as defined in claim 26 wherein the step of selecting embedding sites comprises selecting a subset of the candidate sites in accordance with a pseudorandom sequence.

35. A photocopier as defined in claim 26 wherein:

the message is a sequence of bits; and the step of selectively setting the values of the embedding sites comprises:

associating each bit with a pair of embedding sites;

setting the first but not the second site of a pair to the predetermined dark value if the bit associated therewith has one binary value; and setting the second but not the first site of a pair to the predetermined dark value if the bit associated therewith has the other binary value.

36. A photocopier as defined in claim 35 wherein the step of selectively setting the values of embedding sites comprises leaving unchanged the sites not set to the predetermined dark value.

37. A photocopier as defined in claim 26 wherein:

the message is a sequence of bits; and the step of selectively setting the values of the embedding sites comprises:

associating each bit with a group of three embedding sites;

setting the second but not the first or third sites of a group of three to the predetermined dark value if the bit associated therewith has one binary value; and setting the first and third sites but not the second site of a group of three to the predetermined dark value if the bit associated therewith has the other binary value.

* * * * *

UNITED STATES PATENT AND TRADEMARK OFFICE
CERTIFICATE OF CORRECTION

PATENT NO.     : 6,456,393 B1
DATED          : September 24, 2002
INVENTOR(S)    : Anoop K. Bhattacharjya et al.

It is certified that error appears in the above-identified patent and that said Letters Patent is hereby corrected as shown below:

<u>Column 9,</u>
Line 64, after "with" insert -- the --

<u>Column 11,</u>
Line 29, change "in-put" to -- input -- and

<u>Column 12,</u>
Line 63, change "28" to -- 26 --.

Signed and Sealed this

Eighteenth Day of February, 2003

JAMES E. ROGAN
*Director of the United States Patent and Trademark Office*